United States Patent [19]

Perlman

[11] Patent Number: 5,455,865
[45] Date of Patent: Oct. 3, 1995

[54] ROBUST PACKET ROUTING OVER A DISTRIBUTED NETWORK CONTAINING MALICIOUS FAILURES

[75] Inventor: Radia J. Perlman, Action, Mass.

[73] Assignee: Digital Equipment Corporation, Maynard, Mass.

[21] Appl. No.: 170,686

[22] Filed: Dec. 20, 1993

Related U.S. Application Data

[63] Continuation of Ser. No. 13,671, Feb. 3, 1993, abandoned, which is a continuation of Ser. No. 398,347, Aug. 24, 1989, abandoned, which is a continuation-in-part of Ser. No. 349,448, May 9, 1989, Pat. No. 5,175,765.

[51] Int. Cl.$^6$ .............................. H04L 9/00; H04L 9/30
[52] U.S. Cl. ................. 380/49; 380/23; 380/25; 380/30; 370/60; 370/92; 370/93; 370/94.1
[58] Field of Search ................. 370/60, 61, 85.1, 370/85.13, 85.4, 94.1, 92, 93, 94.3, 99; 395/200; 380/30, 49, 50, 23, 25

[56] References Cited

U.S. PATENT DOCUMENTS

| | | | |
|---|---|---|---|
| 3,781,815 | 12/1973 | Boudreau et al. | 370/61 X |
| 3,979,733 | 9/1976 | Fraser | 340/172.5 |
| 4,058,672 | 11/1977 | Cragar et al. | 178/3 |
| 4,081,612 | 3/1978 | Hafner | 179/15 |
| 4,466,060 | 8/1984 | Riddle | 364/200 |
| 4,527,267 | 7/1985 | Cohen | 370/60 |
| 4,534,024 | 8/1985 | Maxemchuk et al. | 370/85.2 |
| 4,550,397 | 10/1985 | Turner et al. | 370/60 |
| 4,562,539 | 12/1985 | Vince | 395/200 |
| 4,607,363 | 8/1986 | Platel et al. | 370/94.1 |
| 4,617,657 | 10/1986 | Drynan et al. | 370/60 |
| 4,630,260 | 12/1986 | Toy et al. | 370/60 |
| 4,656,658 | 4/1987 | King | 379/221 |
| 4,661,947 | 4/1987 | Lea et al. | 370/60 |
| 4,669,113 | 5/1987 | Ash et al. | 379/221 |

(List continued on next page.)

FOREIGN PATENT DOCUMENTS

| | | | |
|---|---|---|---|
| 0215463A2 | 3/1987 | European Pat. Off. | H04L 11/20 |
| 0225024A2 | 6/1987 | European Pat. Off. | H04L 11/20 |

OTHER PUBLICATIONS

Perlman, R., "Network Layer Protocols with Byzantine Robustness", Ph.D. thesis, Aug. 1988, Massachusetts Institute of Technology, Cambridge, Massachusetts.

Rosen, E., "Vulnerabilities of Network Control Protocols: An Example", Jul. 1981, *Computer Communication Review*, vol. 11, No. 3, pp. 10–16.

(List continued on next page.)

*Primary Examiner*—Bernarr E. Gregory
*Attorney, Agent, or Firm*—Fish & Richardson

[57] ABSTRACT

A method and system for routing information packets among nodes interconnected by links to form a network, each information packet traversing a path of links and nodes from a source node to a destination node. Information indicating the relationships of nodes and links in the network is assembled in the source node. The entire route from the source node to the destination node is computed prior to sending each information packet and the information packet is routed through the network in accordance with the computed route.

Information is assembled about the local topology of the network including the identities of the neighboring nodes which are connected via links to the local node. The local topology information of each local node is distributed to every other node in the network.

Each node is assigned a unique identifier, a unique public key and an associated private key. The source node's assigned identifier, public key and private key are assembled in the source node along with the assigned identifier, public key and associated private key of each of a plurality of other nodes. The computed route is enclosed in a packet. The packet containing the routes is signed and transmitted to each node on the route.

29 Claims, 8 Drawing Sheets

U.S. PATENT DOCUMENTS

| | | | |
|---|---|---|---|
| 4,670,871 | 6/1987 | Vaidya | 370/60 |
| 4,679,189 | 7/1987 | Olson et al. | 370/60 |
| 4,683,563 | 6/1987 | Rousse et al. | 370/16 |
| 4,696,000 | 9/1987 | Payne, III | 370/60 |
| 4,701,906 | 10/1987 | Ransom et al. | 370/60 |
| 4,704,724 | 11/1987 | Krishnan et al. | 379/221 |
| 4,706,080 | 11/1987 | Sincoskle | 340/825.02 |
| 4,737,983 | 4/1988 | Frauenthal et al. | 379/221 |
| 4,740,954 | 4/1988 | Cotton et al. | 370/60 |
| 4,742,511 | 5/1988 | Johnson | 370/94 |
| 4,755,986 | 7/1988 | Hirata | 370/60 |
| 4,787,082 | 11/1988 | Delaney et al. | 370/85.1 |
| 4,787,083 | 11/1988 | Tanaka | 370/85 |
| 4,788,721 | 11/1988 | Krishnan et al. | 379/221 |
| 4,811,337 | 3/1989 | Hart | 370/85.13 |
| 4,825,206 | 4/1989 | Brice, Jr. et al. | 340/825.02 |
| 4,875,208 | 10/1989 | Furuhashi et al. | 370/94.1 |
| 4,926,495 | 5/1990 | Comroe et al. | 370/85.1 X |
| 4,949,337 | 8/1990 | Aggers et al. | 370/85.4 |
| 4,969,146 | 11/1990 | Twitty et al. | 370/85.1 |
| 4,975,952 | 12/1990 | Mabey et al. | 380/49 |

OTHER PUBLICATIONS

Smythe, C. et al., "Code Sequence allocation in a direct sequence spread spectrum local area network", Dec. 1985, *Computer Communications*, vol. 8, No. 6, pp. 283–292.

Baratz, A. et al., "SNA Networks of Small Systems", May 1985, *The IEEE Journal of Selected Areas in Communications*, vol. 3, No. 3, pp. 416–426.

Davis, J. A., "Integrating Communication and Database Services Using Intelligent Internetwork Gateways", Sixth Annual International Phoenix Conference on Computers and Communications, 1987, pp. 361–367.

ISO, "IS to IS Intradomain protocol for use in conjunction with the protocol for providing connectionless mode network service (ISO 8473)", Oct. 15, 1989;ISO/IEC JTC1/SC6/WG2.

ISO, "8473 protocol for providing the connectionless mode service", Sep., 1987, Final Text, ANSI X353-387-.

Moy, J., "The OSPF Specification", Oct. 1989, Proteon, Inc.

"Internet Protocol", Sep. 1981; Defense Advanced Research Projects Agency, Arlington, Va.

Diffie et al. "New Directions in Cryptography", *IEEE Transactions on Information Theory*, vol. IT-22, No. 6, Nov. 1976.

Rivest et al. "A Method for Obtaining Digital Signatures and Public Key Cryptosystems", Communications of the ACM, vol. 21, No. 2, Feb. 1978, pp. 120–126.

McQuillan et al. "The New Routing Algorithm for the ARPANET", *IEEE Transaction on Communications*, vol. COM-28, No. 5, pp. 711–719, May 1980.

Dijkstra "A Note on Two Problems in Connexion with Graphs", Numerische Mathematik, vol. 1, pp. 269–271, 1959.

Dolev "Unanimity in an Unknown and Unreliable Environment", available from the IEEE, New York, N.Y., under catalog No. CH1695-6/81/0000/159, 1981.

Perlman, "Fault-Tolerant Broadcast of Routing Information", *Computer Networks* 7, (1983) pp. 395–405 North-Holland.

Humblet, "Topology Broadcast Algorithms", North-Holland, *Computer Networks*, 1988–1989, pp. 179–186.

Gallagher, "Broadcasting Routing Information, Copying with Link Failures", *Data Networks*, 1987, pp. 345–347.

ROBUST PACKET ROUTING OVER A DISTRIBUTED NETWORK CONTAINING MALICIOUS FAILURES

This is a continuation of application Ser. No. 08/013,671, filed Feb. 3, 1993, now abandoned, which was a continuation of Ser. No. 07/398,347, filed Aug. 24, 1989, now abandoned, which was a continuation-in-part of Ser. No. 07/349,448, filed May 9, 1989, now issued as U.S. Pat. No. 5,175,765.

BACKGROUND OF THE INVENTION

The invention relates to routing packets in a computer network.

A computer network enables devices such as processors, mass storage devices, and printers to communicate with each other over communication links. Each device is connected to a node which interfaces the device to the network, allowing it to transfer data to and from other network nodes. The nodes are interconnected by the communication links in any of a variety of configurations and may contain any number of nodes.

The nodes at both ends of a particular communication link are commonly referred to as neighboring nodes. To send information to a non-neighboring node, a node transmits the information over the communication link connected to a neighboring node. The information is then forwarded from neighbor to neighbor until it reaches its destination.

Data and control messages are typically transmitted over the network in the form of packets. The packets contain, in addition to the data or control messages, network specific information, such as the identity of the source node which prepares the packet and launches it on to the network. This identity information is contained in a first section of the packet referred to as a header, which precedes the data or control message.

Packets may be transmitted from a given source node to a given destination node either by broadcasting the packet over the entire network or by routing the packet along a specific group of nodes connecting the source to the destination. Broadcasting consists of sending a packet to every node on the network.

One method of broadcasting packets over the network is called flooding. Flooding requires each node which receives a packet to transmit it to each of its neighboring nodes, except the node from which it was received. Copies of the packet eventually travel throughout the network to every node over every communication link. Typically multiple copies of the packet reach every node.

Alternatively, a packet may be sent to a destination node via a single route. Typically the source node launches a packet to a destination node by providing a neighbor node with the packet and with information regarding its destination. The neighbor, and each subsequent node which receives the packet, makes an independent decision as to the next node to which the packet should be forwarded in order to reach the destination specified by the source.

Such routing (called path specific routing) is less costly than flooding because it avoids redundant transmissions; but if a single node along the specified path fails to forward the packet, the destination node will not receive it. In flooding, conversely, individual node failures will not prevent delivery of a packet as long as a complete functioning path connects the source and destination.

Path specific routing operates reliably only if a reliable model of the network topology is maintained. This may be provided manually by a system operator updating the network model each time a node is added to and removed from the network.

A packet traveling over a network may be lost or corrupted by improperly operating nodes (i.e., nodes with faulty hardware or software) and by network misconfigurations.

Improperly operating nodes may delay packets, sporadically lose packets, alter packets, and fail to transmit packets to or from a particular node, thus disrupting the delivery of one or more specific packets. An improperly operating node may also generate such a high volume of traffic, for example, by transmitting packets at a rate which is faster than the network nodes can process, so as to congest the entire network. Node failures in which the node continues to operate, but in a faulty manner, are generally called byzantine failures.

Nodes may operate "maliciously" as a result of, for example, network sabotage. A malicious node may delay, alter and/or fail to transmit selected packets while properly transmitting others. Further it may purposefully transmit inaccurate or conflicting information in a form which appears correct.

SUMMARY OF THE INVENTION

The present invention comprises a number of features which may be used individually, or preferably together, to minimize disruption to message delivery due to malfunctioning nodes in a network.

the present invention also comprises a method of source-specific message routing in a hierarchical network which may be used in combination with the aforementioned features.

One aspect of the present invention is a method and apparatus for protecting properly functioning no=des from having their message deliveries disrupted by malfunctioning nodes which might attempt to overload network link capacity. Specifically, each node allocates an equal portion of its available link capacity (i.e., bandwidth) to each of the source nodes from whom packet currently are awaiting transmission over the link, thereby preventing any single source node, or group of source nodes, from monopolizing the link.

Another aspect of the present invention is a method and apparatus for preventing a malfunctioning node from overloading a node's memory capacity for storing received messages or packets. Specifically, each node reserves a minimum amount of memory for receiving messages from every possible source node, thereby ensuring that the receipt of a large number of messages from a malfunctioning node will not prevent the receiving node from having memory space for messages received from other nodes.

Another aspect of the invention is a method and apparatus for rejecting messages which are unreliable because they were transmitted via network paths that include a faulty node or faulty link. Specifically, each data message transmitted to a node is preceded (or accompanied) by a "route setup" message transmitted to that node which specifies the route along which the data message is to be propagated in the network. The node receiving the message verifies whether the data message arrived from the neighbor node specified in the route setup message. If not, the data message is assumed to be unreliable, and it is discarded by the receiving node.

Another aspect of the invention is a method and apparatus for overcoming malfunctions which may cause numerous copies of a single message, or replays of previous messages, to be received by a node. According to this aspect of the invention, each node includes with each message it originates a sequence number which is incremented for each successive message originated by that node. As other nodes receive a number of messages, from the same source node, the messages from a given source with the lowest sequences numbers, or duplicate sequence numbers, are discarded by the receiving node.

Another aspect of the invention is a method and apparatus for preventing malfunctioning or malicious nodes from impairing network performance by originating erroneous messages which identify the wrong node as the source node. Unless detected, such erroneous messages could consume network resources (e.g., node memory or link bandwidth) which otherwise would be allocated to authentic messages from the named source node. According to this aspect of the invention, each node on the network is assigned a private key and a public key. The public key for each node in the network is broadcast to every other node in the network. When a node originates a message, it appends to the message a "signature" computed as a function of the message data and the originating node's private key. When a node receives a message, it decodes the signature using the originating node's public key and verifies whether the decoded signature has the proper correspondence to the message data. If not, the message is recognized as unauthentic and is discarded by the receiving node.

Another aspect of the invention is a method and apparatus which automatically selects a different path for routing messages from a source node to a destination node if a number of messages from the source to the destination are not acknowledged. According to this aspect, one way to select a different path is for the source node to compute a new path which includes none of the nodes in the previously used path. Another way to select a different path is for the source node to first send messages to a number of nodes on the original path to identify faulty nodes, and for the source node to then compute a new path which includes none of the faulty nodes. A third way is for the source node to broadcast messages to the destination over numerous paths simultaneously.

Another, quite different, aspect of the present invention is a method and apparatus for performing source-specified message routing in a hierarchical network. Specifically, a source node specifies (preferably via a "route setup" packet or a "route specification" message field in a data packet) the route over which a message is to be propagated only up to the node (e.g., a router) at which the message is transferred to a different level in the network hierarchy. The node (router) which transfers the message to the new level computes and specifies the route over which the message is to be propagated within the new level. This is repeated in turn each time the message is transferred to a higher or lower level in the network.

The preceding aspect of the invention preferably is combined with the previously described inventive use of signatures to authenticate the source of a message. Specifically, a node originating a message includes a signature encoded using the originating node's private key, as stated earlier. The node (router) which transfers the message to a different level of the network hierarchy verifies the authenticity of the message using the originating node's public key. The transferring node (router) then replaces the message source address field with its source address, and replaces the signature with a new one computed using the transferring node's private key. This aspect of the invention permits messages to be authenticated without requiring public keys to be distributed outside a single level in the network hierarchy.

Other advantages and features will become apparent from the following description of the preferred embodiment and from the claims.

DESCRIPTION OF THE PREFERRED EMBODIMENT

We first briefly describe the drawings.

Drawings FIG. 1 is a block diagram of a network of nodes.

FIG. 7b is a diagram of a level 2 sub-network of the hierarchical network of FIG. 8a.

Figure 1:
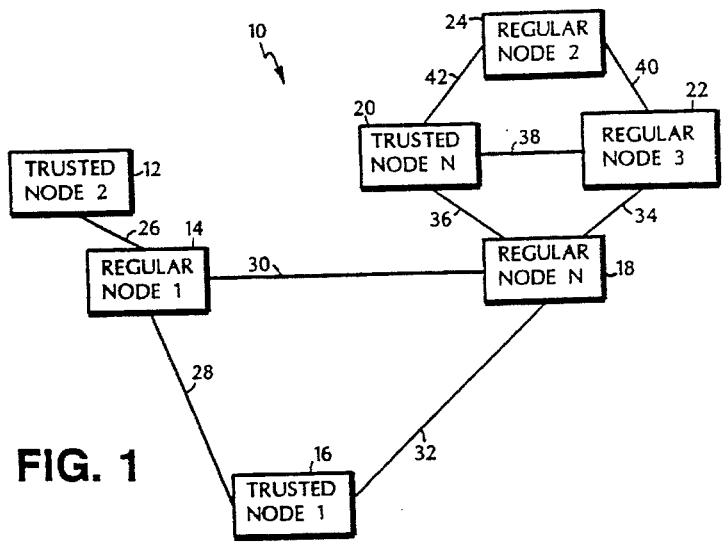

Referring to FIG. 1, a small network 10 includes nodes 12–24 interconnected by communication links 26–42. Each node may be served by a number of links connecting the node respectively to different neighboring nodes. For example, node 16 has two neighbors 14, 18. Each node serves one or more devices, such as mass storage devices, data processors, or terminals (not shown).

The devices served by the nodes can communicate with each other by sending data packets over the network. For example, a data packet originated by node 16 (the source) may travel to node 24 (the destination) via nodes 18 and 22 and their respective links 32, 34, and 40. However, a variety of alternative routes may be used such as the route defined by nodes 14, 18, 20 and links 28, 30, 36 and 42.

In the invention, each node determines in advance the complete route to the destination node to which it intends to send a packet. In order to determine the route, the source node must have accurate current information about the configuration of the nodes and links that form the network. Public key cryptography techniques are used, for among other purposes, to identify the source of such information.

The principles of public key cryptography are described in W Diffie and M. E Hellman, "New Directions in Cryptography", IEEE Trans. Inf. Theory, Vol. IT-22, pp. 644–654, November 1976, incorporated herein by reference. Briefly, public key cryptography involves the use of a pair of associated "keys" E, D for encrypting and decrypting data, respectively. The keys are operated upon by a pair of inverse functions: encrypting data with a key E allows decryption with key D. However, the encryption and decryption functions are chosen to be "one-way functions" such that even with knowledge of the encryption function and its key E, it is computationally infeasible to calculate the decryption key D. Accordingly, if a node N. publicly distributes its key $E_a$ while maintaining the inverse key $D_a$ private, two types of security can be achieved. First, privacy can be achieved since all other nodes can encrypt messages with key $E_a$ prior to transmission over nonsecure channels or links. Since only $N_a$ knows private key $D_a$, only $N_a$ can decrypt the message. Secondly, authentication can be achieved since $N_a$ can uniquely identify itself as the author of messages which it originates by producing a digital number or "signature" based on the private key and the data to be signed. Receiving nodes verify the signature using the public key $E_a$. Since only a node with knowledge of the private key could so encrypt its signature, receiving nodes are assured that $N_a$ was the source of the signed packet. The use of public key cryptography to authenticate a digital signature is discussed more fully in R. L. Rivest, A. Shamir, and L. Adleman, "A method for obtaining Digital Signatures and Public Key Cryptosystems," *Communications ACM*, vol 21, pp 120–126, February 1978, incorporated herein by reference.

Returning again to FIG. 1, each node in the network is assigned a unique identification number and a unique pair of associated keys, one private, the other public.

Referring to FIG. 2a, each node has nonvolatile memory 44 and volatile memory 45. Prior to operation of the network, each node's nonvolatile memory 44 is initialized with the following:

1) the local node's unique ID 46, private key 48, and public key 50;

2) the maximum number 52 of nodes which can be connected to the network;

3) the maximum size 54 of a data packet;

4) the maximum size 56 of link state packets;

5) a cost 58 associated with each of the local node's links to its neighbors; and 6) a data packet sequence number 60 for use upon restarting the node after a failure.

After nonvolatile memory 44 has been initialized, volatile memory 45 is loaded with a public key list 62 comprising each node's assigned ID number and its associated public key. Once this public key list (herein PKL) is loaded, the node proceeds to allocate a data packet memory block 64 for storage of at least one data packet from each listed node. The node further allocates a link state packet memory block 66 for at least one link state packet from each listed node.

Figure 3A:
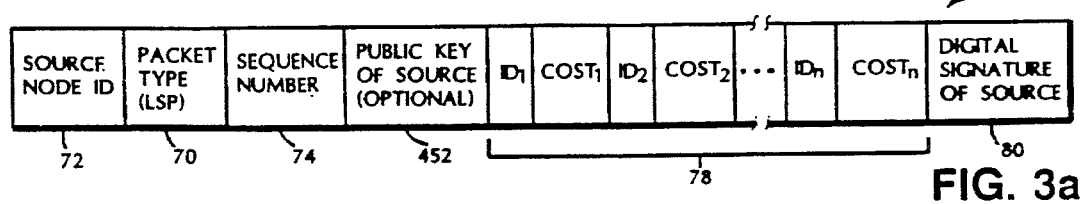
FIG. 3a is a diagram of the contents of a link state packet.
Figure 3B:
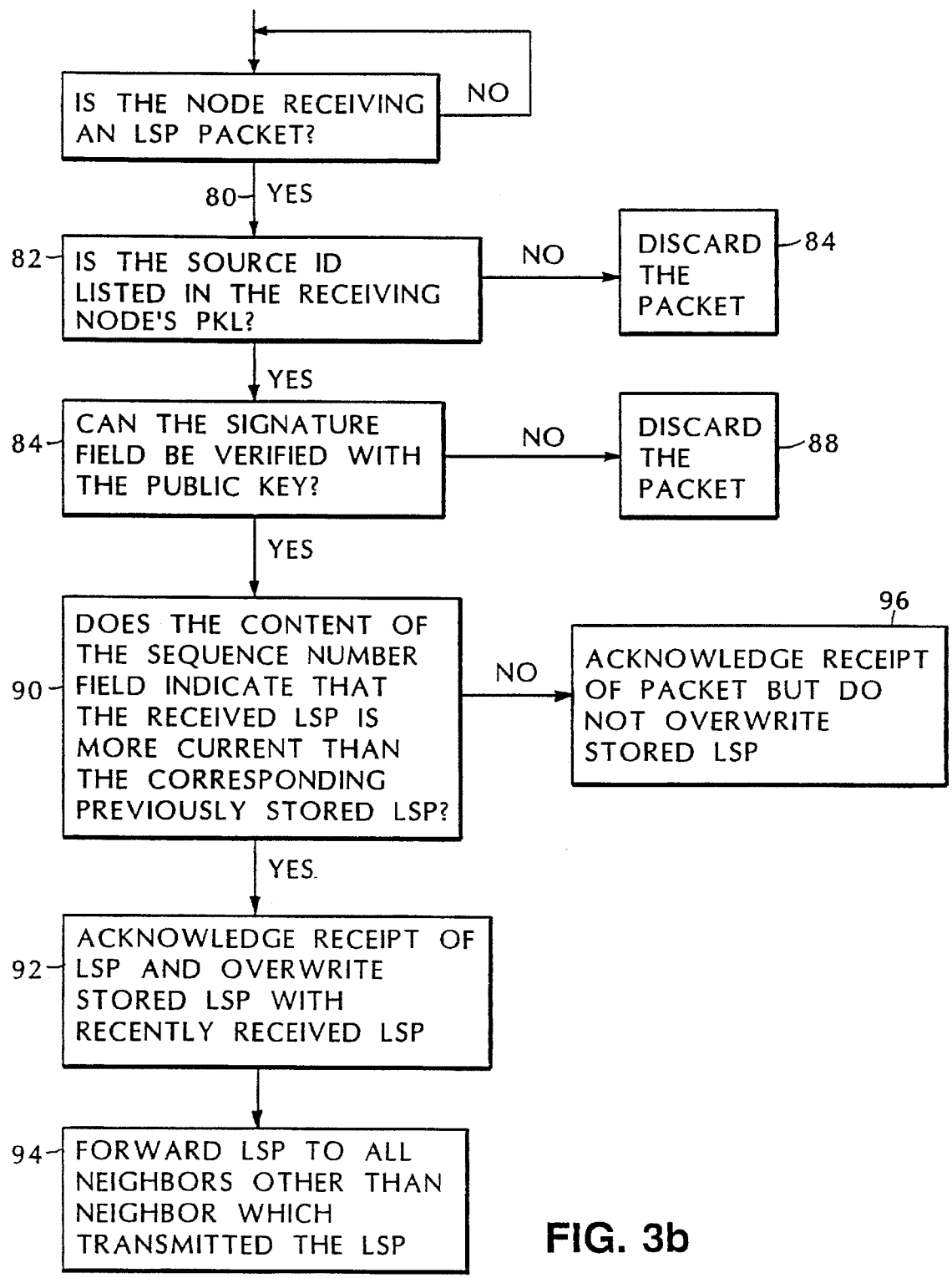
FIG. 3b is a flow diagram of the steps performed by a node upon the receipt of a link state packet.

Referring to FIGS. 3a, 3b, armed with a reliable PKL, regular nodes can collectively explore the network topology by first discovering the identity of their neighbors. This may be accomplished with the execution of a simple handshake in which a node sends a signed identification packet containing its node ID and public key over each of its links. Each neighbor reciprocates with its own signed identification packet. Each received ID packet is verified by first comparing the ID/public key pair with that stored in the PKL. If these match, the signature of the ID packet is verified using the public key. Any neighbor unable to provide a valid ID packet is ignored. Once a node has identified all its neighbors, it prepares a signed link state packet (LSP) which identifies the node and all its neighbors. This packet is broadcast to the entire network. Accordingly, each node in the network receives an LSP from every other node in the network and stores it in memory block 66 allocated to the source node's LSP packet. From its collection of received LSPs, a node can determine the topology of the network and accordingly select a desired route for transmitting its data packet.

Figure 2:
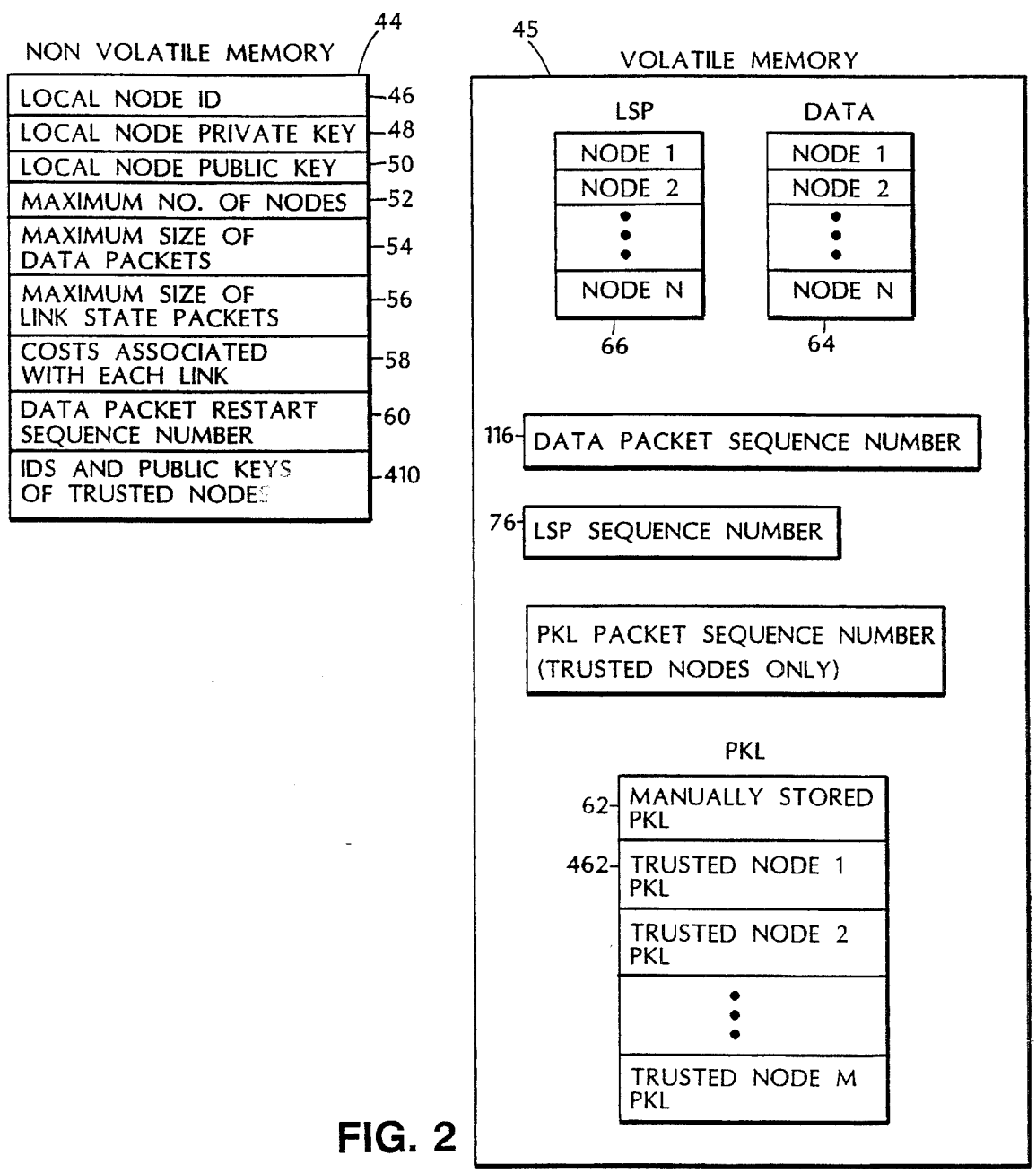
FIG. 2 is a diagram of the contents of each node's memory.

Referring to FIG. 3a, each LSP packet 68 includes a collection of fields. A packet type field 70 contains a code distinguishing the LSP packet from other packet types such as data packets. A source ID field 72 contains the unique identification number of the source node which prepared and introduced the LSP to the network. The sequence number field 74 contains a packet count number to allow nodes to recognize outdated packets. Since the most recent packet originated by the node contains the highest sequence number, the relative vintage of two packets can be determined by comparing their sequence numbers. The current value of the LSP's sequence number is maintained in a memory location 76 of volatile memory 45 (FIG. 2). The size of the sequence number field 74 is chosen (e.g., 64 bits) such that it is unlikely that the sequence number will reach its maximum value unless the source node is malfunctioning.

The LSP packet further contains a data field 78 comprising a list of all neighbor ID's and the cost 58 (FIG. 2) associated with each neighbor's link. This cost is selected to represent the link's bandwidth.

Finally, digital signature field 80 contains the signature of the source node. This signature is derived from the source node's private key and the digital patterns in fields 72–78.

Referring to FIG. 3b, upon receipt 80 of an LSP packet, the receiving node first verifies 82 that the packet is valid by checking the source ID field 72 against the IDs listed in the PKL. If no match is found, the receiving node simply discards 84 the LSP. If a match is found, the receiving node proceeds to verify 86 the LSP's signature field 80 using the source node's public key. If the signature is bogus, the receiving node discards 88 the packet. If the signature is genuine, the node assumes the packet was originated by a properly functioning authorized node. However, before replacing a previously stored LSP packet, the node checks 90 the sequence number field to determine if the received packet is more current than the previously stored packet. If the received packet is more current, it is stored 92 in the allocated memory 66 (FIG. 2) and queued for forwarding 94 to all neighbors other than the node which transmitted it to the receiving node. If it is not more current, the receiving node will merely acknowledge 96 receipt of the packet but will not replace the previously stored packet.

After collecting a portfolio of LSPs, a node is able to compute a desired route for the transmission of its data packet to a specific destination node. For example, if node 16 desires to transmit a packet to node 24, it examines its portfolio of LSP's and computes an efficient route taking into account the costs associated with each link. Any efficient graph algorithm for computing paths incorporated by reference herein, may be used to select a route. For example, the algorithm described in J.M. McQuillan, I. Richer, and E. C. Rosen, "The New Routing Algorithm for the ARPANET", IEEE Transactions on Communications, Vol Com-28, No. 5, May 1980, incorporated by reference herein, may be used. This algorithm is based on an algorithm described in E. W. Dijkstra, "A Note on Two Problems in Connexion with Graphs", Numer Math Vol 1, pp 269–271, 1959, also incorporated by reference herein.

Once the source node has chosen a desired route, it informs all nodes along the route of its choice, instructing them to forward the data packet along the specified route. With packet specified routing, this is done by placing the route in a data packet field specifically designated for the route.

Figure 4A:
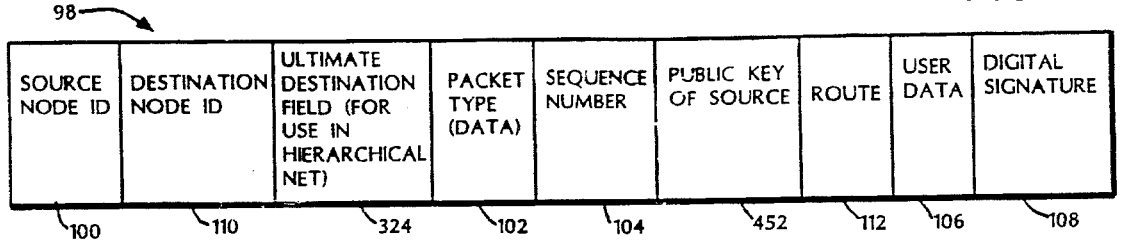
FIG. 4a is a diagram of the contents of a data packet used with packet specified routing.

Referring to FIG. 4a, a data packet 98, like an LSP packet, contains a source node ID field 100, a packet type field 102, a sequence number field 104, a user data field 106, and a digital signature field 108. For routing purposes, a data packet also contains a destination node ID field 110 and a route field 112.

Figure 4B:
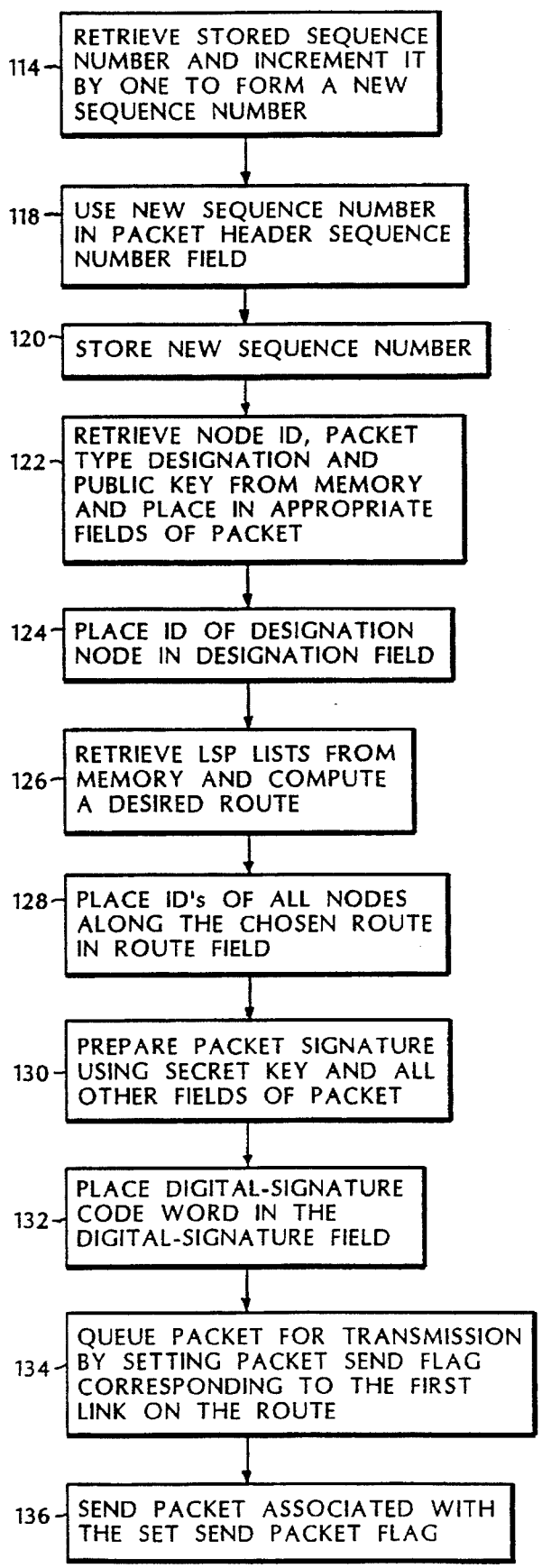
FIG. 4b is a flow diagram illustrating the steps performed by a node in the preparation of a data packet and in the transmission of the packet using packet specified routing.

Referring now to FIG. 4b, a node originates a data packet 98 by first retrieving 114 from memory location 116 (FIG. 2) the sequence number of its most recent packet. The node increments the retrieved sequence number by one and uses 118 the new number as the contents of the packet sequence number field 104. It then updates memory 116 by storing 120 the new sequence number. The node next includes 122 the designation for the type of packet (i.e. data) in the packet type field 102. It further retrieves 122 from non-volatile memory 44 its unique node ID 46 (FIG. 2) and uses it as the contents of the packet source node identity field 100. The ID of the destination node is placed 124 in the destination ID field 110.

To compute the desired route the node retrieves 126 from memory the collection of LSP's and implements, for example, the graph algorithm described in J. M. McQuillan, I. Richer, and E. C. Rosen, "The New Routing Algorithm for the ARPANET", IEEE Transactions on Communications, Vol Com-28, No. 5, May 1980. The resultant ordered list of each node ID along the chosen route is then placed 128 in route field 112.

The node next generates 130 a digital-signature by manipulating its private key and the contents of all other fields 100–106, 110–112. For example, R. L. Rivest, A. Shamir, and L. Adleman, "A method for obtaining Digital Signatures and Public Key Cryptosystems," *Communications ACM*, vol 21, pp 120– 126, February 1978 describes in more detail the generation of digital signatures. The resultant digital-signature is then used 132 as the content of the packet's digital-signature field 108. The packet is now ready to be transmitted, and the node queues it 134 for transmission to the first node on the chosen route.

The node queues the packet for transmission by setting 134 a PACKET SEND flag corresponding to a communication link leading to the neighboring node. The nodes use the flags to allocate fairly the limited network bandwidth among the network nodes. A node sets the appropriate PACKET SEND flags for each packet which is ready for transmission and thus queues the packets for transmission over the communication link to which the flags correspond. When a communication link becomes available, the node scans its data-base in a "round-robin" fashion, starting at the flag which signaled the previous transmission, until it encounters a set PACKET SEND flag indicating a packet is to be sent over the link. The node then transmits 136 the packet associated with the flag over the link to the associated neighboring node. If the link is still available, the node scans for another set PACKET SEND flag associated with the link. When one is found, the node transmits the appropriate packet. In this way, the node transmits over an available communication link, in turn, packets associated with each of the network nodes.

Eventually, the node scans around the entire data-base and, if no acknowledgement has yet been received, returns to a set flag associated with an earlier transmitted packet. The node again sends the packet and again scans for the next set flag. The node continues to transmit the packets associated with set PACKET SEND flags whenever the appropriate communication links become available.

A second flag and a special "neighbor acknowledgement packet" are used by a receiving node to acknowledge receipt of a valid packet from its neighbor. The receiving node sets the neighbor ACK flag, to indicate that it has a transmission to make over the communication link. When it is the node's turn to transmit a packet over the link, the node generates the acknowledgement packet and transmits it to the packet transmitting node.

When the transmitting node receives a valid acknowledgement packet it clears the PACKET SEND flag corresponding to the acknowledged packet. The node will not then re-send the packet over this link. The node thus frees network bandwidth for the transmission of other, as yet unacknowledged, packets. The use of an ACK flag and the acknowledgement packet are discussed in more detail below with reference to FIGS. 5a, 5b.

Figure 5A:
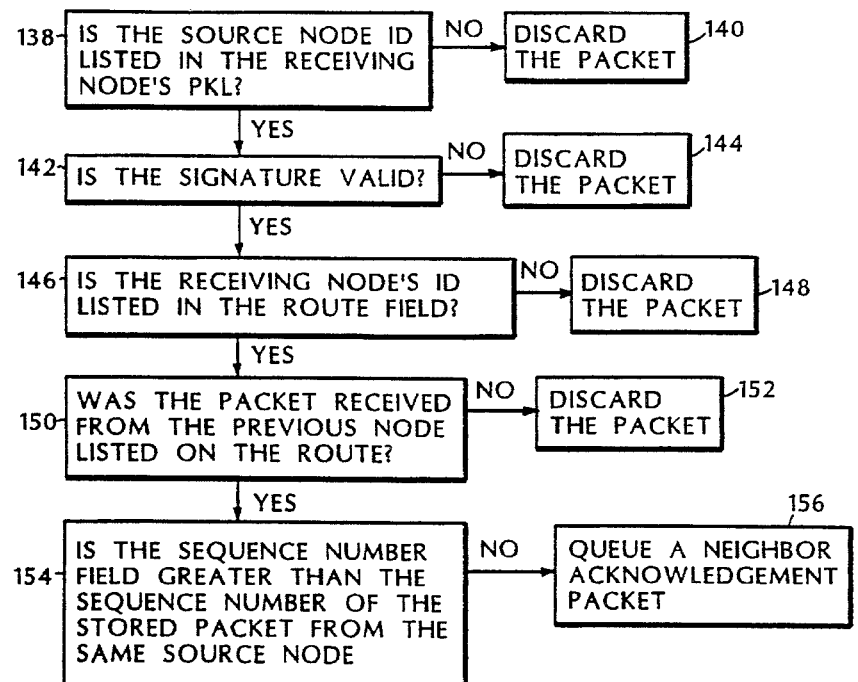
FIGS. 5a, 5b are flow diagrams of the steps performed by a node upon the receipt of a data packet using packet specified routing.
Figure 5B:
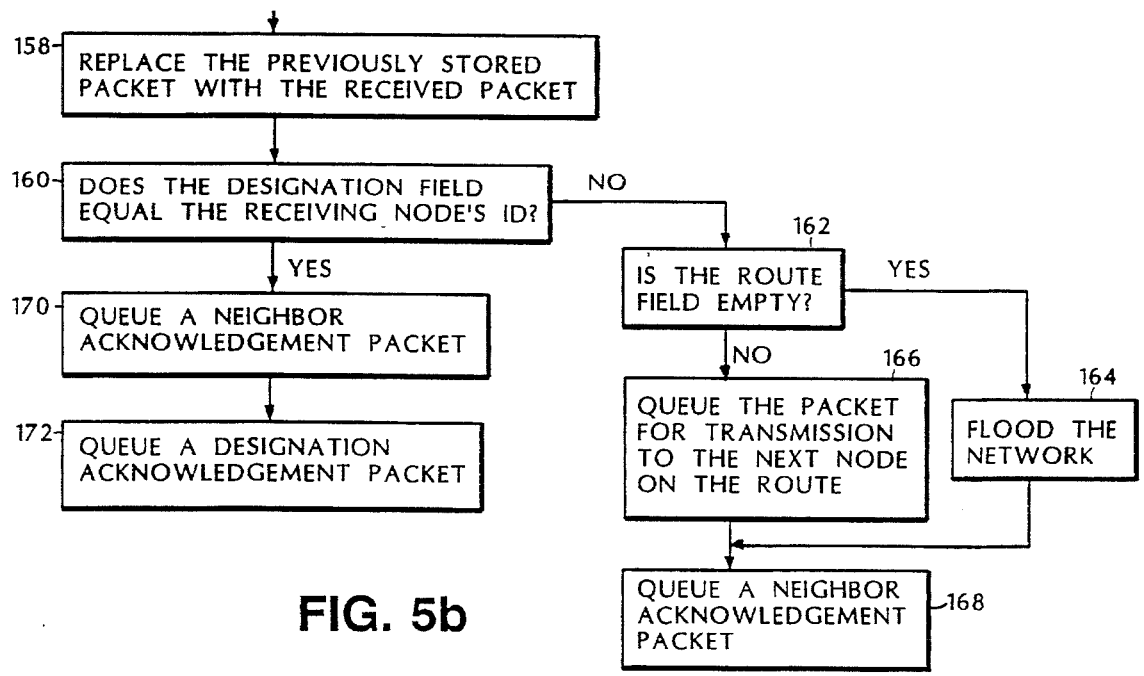

Referring to FIGS. 5a, 5b, upon receiving a data packet, the receiving node first verifies 138 that the packet is valid by comparing the contents of the source node ID field 100 with node IDs listed in the PKL stored in memory 62 (FIG. 2). If the node is not listed in the PKL, the receiving node discards 140 the packet.

If the receiving node does have stored the node identifier corresponding to the source node, the receiving node retrieves from memory 62 the associated public key and verifies 142 the digital signature using the public key and the contents of the packet. If the signature is invalid, the node discards 144 the packet. If the signature is valid, the receiving node next determines 146 if its ID 46 (FIG. 2) is listed in the specified route. If not, the packet is discarded 148. If the receiving node is on the specified route, it further determines 150 if the packet was received from the previous node listed in the route list. If not, the receiving node discards 152 the packet. If the packet arrived from the specified node, the receiving node proceeds to determine 154 if the received packet is the newest one associated with the source node. Toward this end, the receiving node retrieves the packet stored in the memory location assigned to the source node. It then compares the contents of the sequence number fields 104 of the received packet and the stored packet.

If the sequence number of the received packet is not larger than the sequence number of the stored packet, the receiving node simply notifies 156 the transmitting neighbor that it has received the packet. However, if the received packet has a larger sequence number, it is considered newer. The receiving node thus replaces 158 the packet previously stored in memory block 64 with the new packet.

The receiving node next compares 160 the destination field 110 to the receiving node's ID 46. If the IDs do not match, the node next examines 162 route field 112 to determine whether the source node specified a specific route for forwarding the packet or if flooding was the chosen routing scheme. If the routing field is empty, the receiving node will flood 164 the network by forwarding the packet to all neighbors except the one who transmitted the packet. If a route is specified, the node queues 166 the packet for transmission to the next node on the route by setting the appropriate PACKET SEND flags.

After forwarding the packet by either means, the receiving node next sets 168 a neighbor ACK flag to indicate that it will transmit a neighbor acknowledgement packet when it is the node's turn to use the communication link. The neighbor acknowledgement packet contains: (i) the identifier of the data packet source node; (ii) the sequence number of the data packet; (iii) the public key used to decode the packet digital-signature; and (iv) the packet digital-signature. All this information is copied from the data packet. Each item is included in the packet to identify distinctly the data packet being acknowledged.

If the receiving node ID matches the destination node ID, the receiving node transmits 170 a neighbor acknowledgement packet as above. However, it further sets 172 a destination ACK flag and prepares a destination acknowledge packet for transmission back to the source node, verifying receipt of the data packet. This packet includes items i–iv above and further includes: (v) the ID of the destination node, (vi) the public key of the destination node, (vii) the route copied from route field 112, and (viii) a digital signature of the destination node using the node's private key and items (i–vii) above. This packet is transmitted back to the source along the same route which the data packet traversed. If the data packet was flooded, the destination acknowledge packet is also flooded.

If a source node does not receive a source acknowledgement packet, it computes a new route and tries again. Preferably, the new route is a "node disjoint" path (i.e. one that does not cross the previously tried route). Further, the source node may query nodes along the route in an attempt to locate the failure and select a route which bypasses it. Finally, the source node may opt to broadcast the packet by flooding, thereby assuring that the packet will reach its destination if a functional path exists.

Figure 6A:
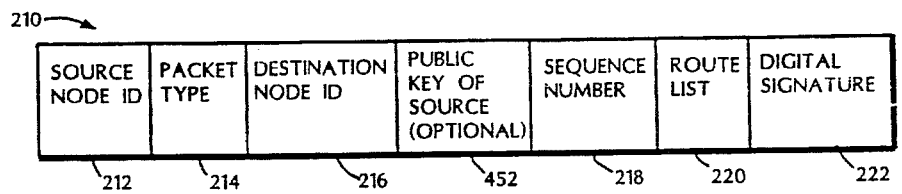
FIG. 6a is a diagram of the contents of a route state packet.

Referring to FIG. 6a, rather than providing the route in the packet header as described above, a source node may alternatively transmit a route setup packet 210 to all intermediate nodes along the route prior to launching any data packets. Route setup packet 210 comprises source ID field 212, packet type field 214, destination node ID field 216, sequence number 218, route field 220, and digital signature field 222. This packet may be transmitted to the intermediate nodes using the above described packet specified routing. In this regard, route field 220 operates as the above described route field 112 of a data packet. It contains a list of the ID numbers of each node on the route, arranged in the order which the packet will travel. However, in this instance, the route field not only operates to direct the transmission of the route setup packet, it notifies all nodes along the way that future data packets between the source and destination nodes identified in fields 212, 216 respectively, should be forwarded along the same path. Toward this end, each intermediate node stores in its memory the contents of the route setup packet.

Route setup packets may also be transmitted by flooding. However, in this instance, since route field 220 contains the chosen data packet route, an alternative means must be chosen to indicate that flooding of the route setup packet is desired. For example an additional field can be added to the route setup packet for indicating whether flooding is desired.

Figure 6B:
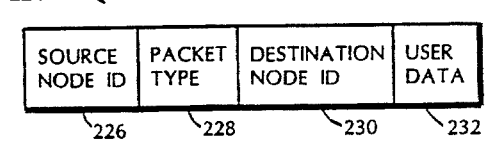
FIG. 6b is a diagram of a data packet used with route setup routing.

Referring to FIG. 6b, a data packet 224 used in the route setup scheme need only contain a source node ID field 226, a packet type field 228, a destination node ID field 230, and a user data field 232. Unlike data packets used in packet specified routing, data packet 224 need not contain a route field 112 (FIG. 4a) since the route is preannounced by the route setup packet. Further, the use of route setup packets eliminates the need for each node along the path to verify the signature and sequence number of each data packet. Once a node has received a route setup packet and verified that it was genuine, the node can now verify data packets simply by checking that the packet came from the direction specified in the route packet. Accordingly, the data packet does not require a digital signature field. In addition to freeing bandwidth, this frees substantial processor time used in verifying signatures. However, these savings come with the price of increased memory for storing a collection of route setup packets.

Figure 6C:
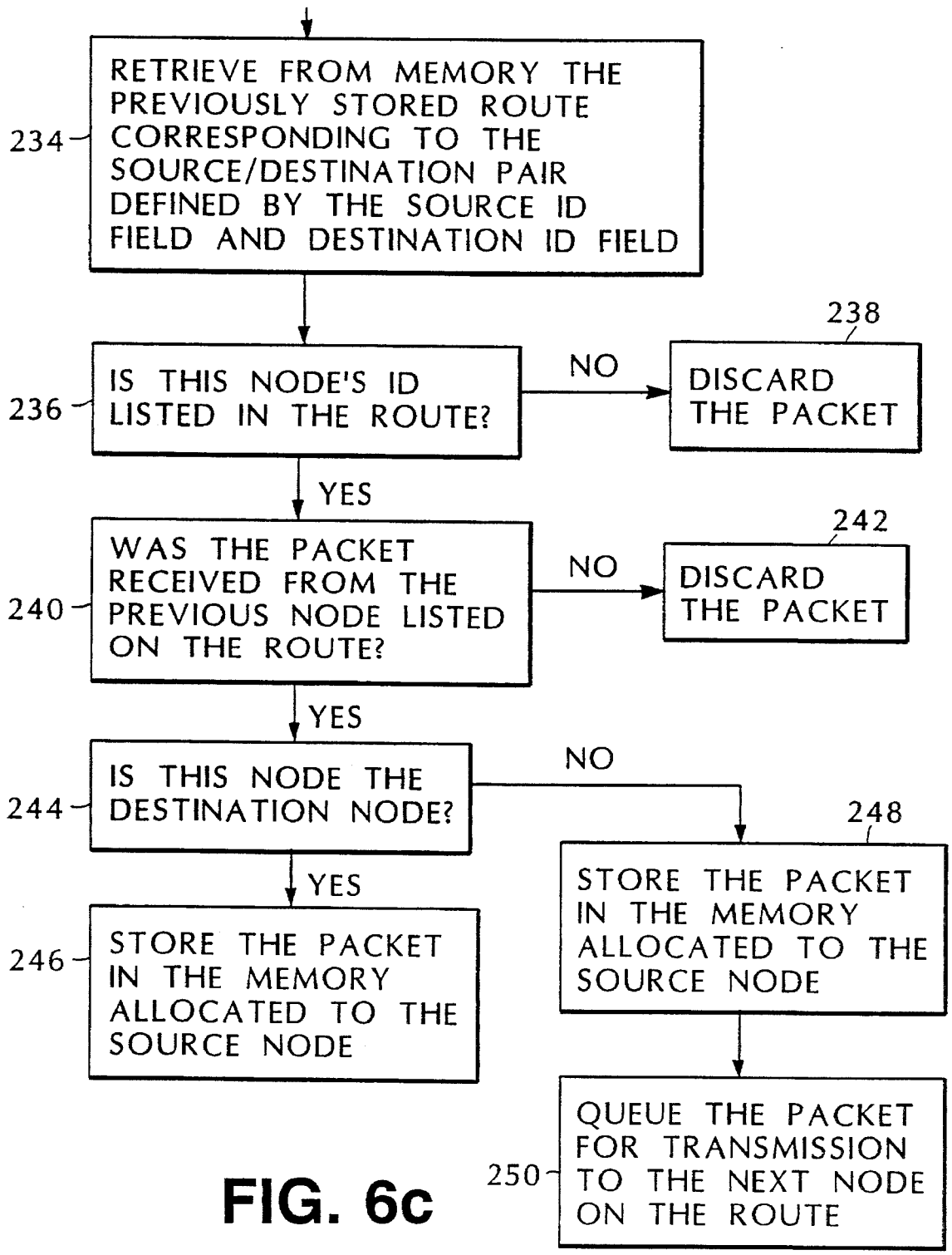
FIG. 6c is a flow diagram of the steps performed by a node upon the receipt of a data packet using route setup routing.

Referring to FIG. 6c, upon receipt of a data packet 224, the receiving node retrieves 234 from memory the route corresponding to the source/destination pair identified in fields 226, 230 and determines 236 if the receiving node is specified in the chosen route. If no such route is stored or if the stored route does not include the receiving node, the packet is discarded 238. If the receiving node is on the stored route, it proceeds to determine 240 if the packet arrived from the previous node specified in the stored route. If not, the packet is discarded 242. If the packet arrived from the specified direction, the receiving node determines 244 if its ID is the destination node ID specified in field 230. If the IDs match, the data packet is stored 246 in the allocated memory 64 (FIG. 2). If the receiving node is not the destination node, it stores 248 the data packet in the allocated memory and queues 250 the packet for transmission to the next node on the route.

Figure 7A:
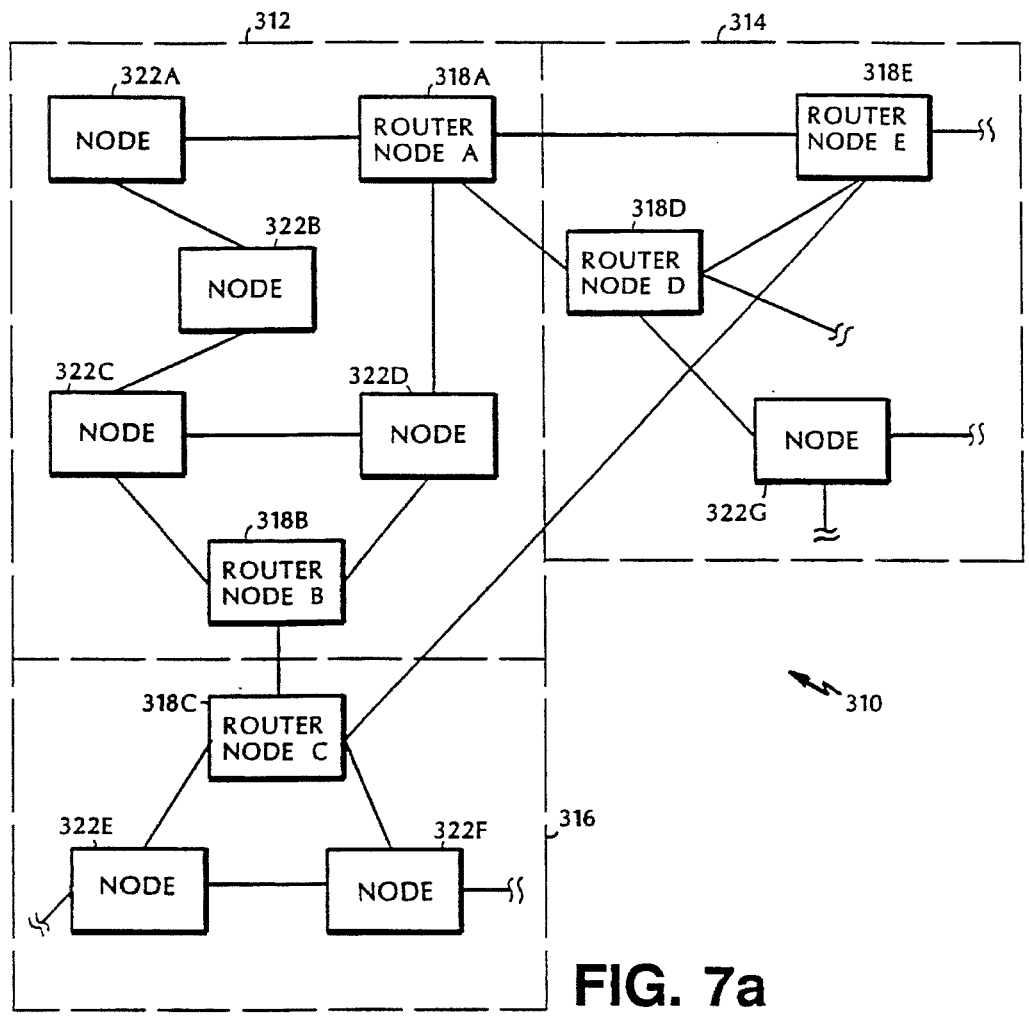
FIG. 7a is a diagram of a hierarchical network.
Figure 7B:
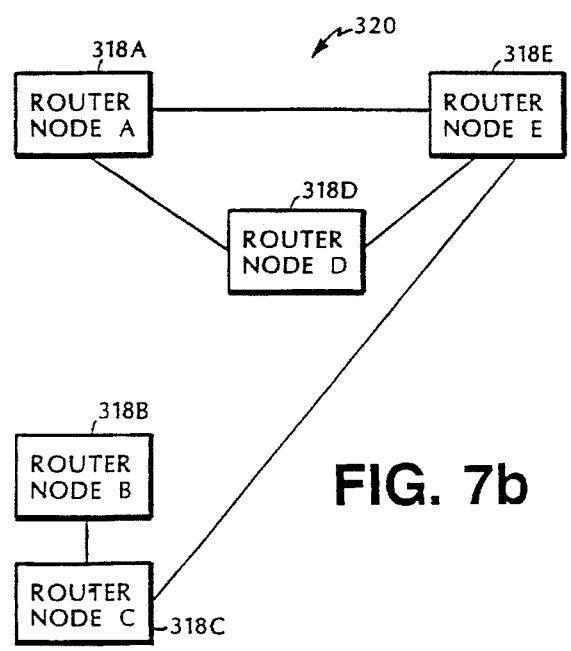
Figure 8B:
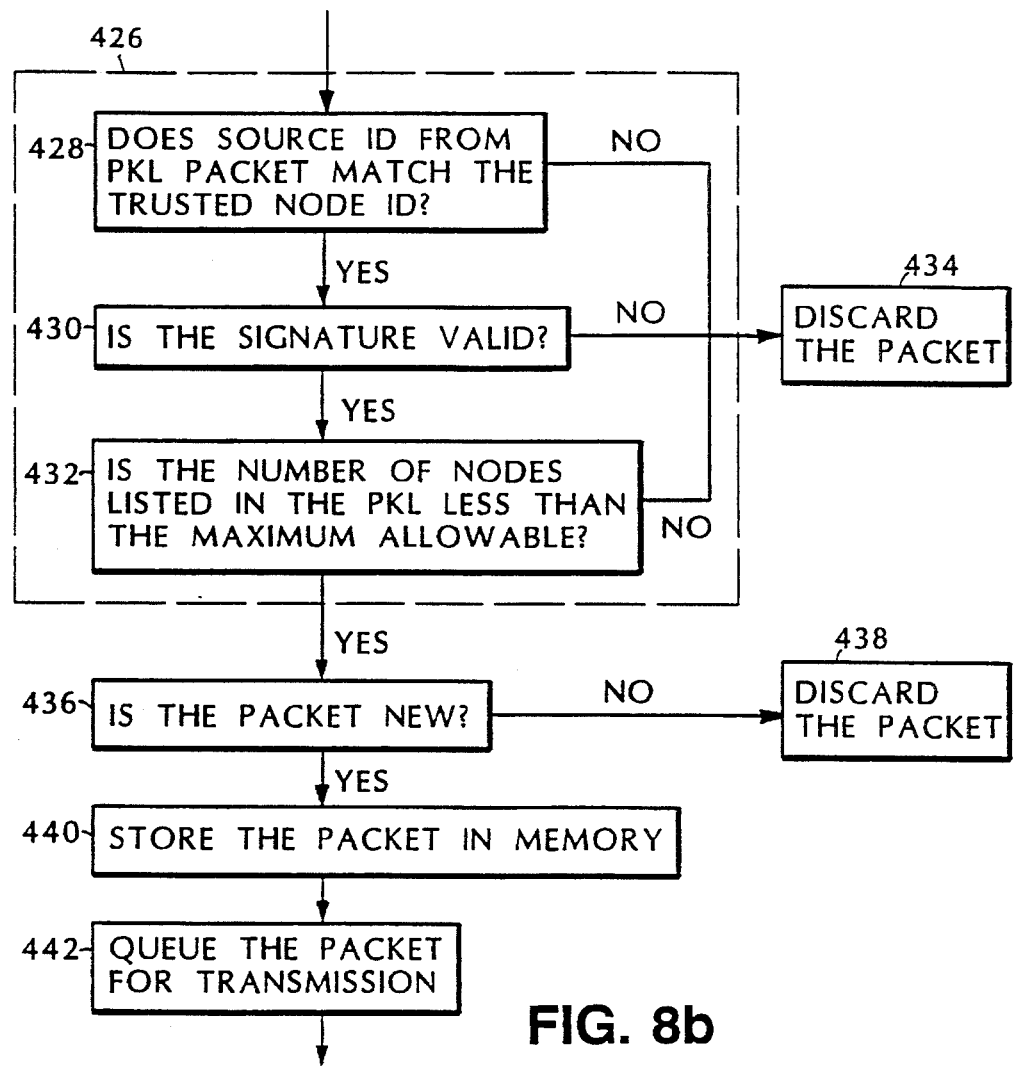
FIGS. 8b, 8c are flow diagrams of the steps performed by a node upon the receipt of a public key list packet.
Figure 8C:
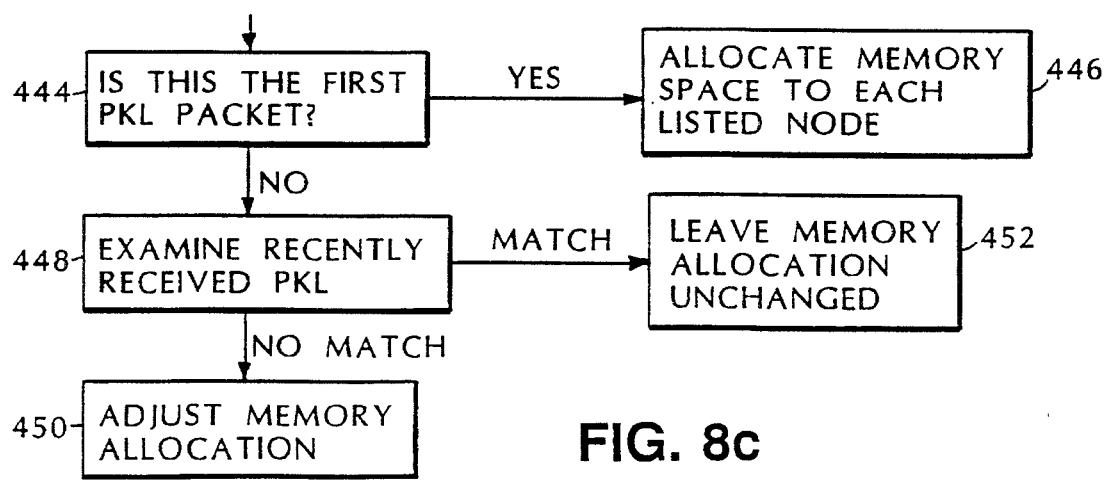

Packets may also be routed over hierarchical networks, partitioned into several sub-networks. FIG. 7a illustrates a network 310 which is subdivided into several level one sub-networks 312, 314, 316. Each level one sub-network 312–316 contains at least one node capable of transmitting packets from the level one sub-network to a level two sub-network. These nodes, referred to as level two routers 318, are interconnected to form a level two sub-network 320 (FIG. 7b). When a packet is to be transmitted from a source node residing in one level one sub-network to a destination node residing in a different level one sub-network, the level two sub-network 320 acts as a bridge between the two level one sub-networks. To allow the unique identification of nodes across sub-networks, each assigned node ID includes a sub-network field identifying the sub-network in which the node resides Each level two router 318 functions as a node on both a level one sub-network and a level two sub-network. In order for a level two router to transmit packets on both sub-networks to which it has access, it must know the identifiers and public keys associated with the nodes on both the sub-networks. Thus each level two router 318 receives a PKL and LSPs for both the level one and level two sub-networks to which it belongs. The level two routers are the only nodes which require such information about more than one sub-network. The nodes 322 on the level one sub-network which are not level two routers store information concerning only the nodes on their level one sub-network. Thus each node is not required to maintain information about the complete network, which may consist of many sub-networks, in order to transmit packets destined for one or more nodes on a different sub-network.

To implement path specific routing across sub-networks, an "ultimate destination" field 324 (FIG. 4a) is added to the data packet for use when the source and destination nodes are in different sub-networks. To illustrate, the transmission of a data packet from source node 322A of sub-network 312 to destination node 322F of sub-network 316 is described. Source node 322A first calculates a path to a level two router such as 318A. Node 322A stores node 318A's ID in destination ID field 110 and places the route to node 318A in route field 112. Node 322A finally stores node 322F's ID in the ultimate destination field 324 and launches the packet toward router 318A. Upon receipt of the packet, router 318A calculates a route along level two sub-network 320 (FIG. 7b) to any node in the desired level one sub-network 316. In the network shown in FIG. 7a, only one such node exists, Router 318C. Accordingly, router 318A places the route to node 318C in the route field and replaces the contents of destination node ID field 110 with the ID of node 318C. Further, router 318A replaces the contents of source node ID field 100, and sequence number field 104, with its own ID and sequence number. Next, router 318 signs the packet and launches it over level two sub-network 320 to router 318C. Upon receipt of the packet, router 318C calculates a route over level one sub-network 316 to the ultimate destination identified in field 324, namely, node 320F. Again the source ID field 100, destination node ID field 110, sequence number field 104, route field 112, and signature field 108, are amended to reflect the new source node (318C) and the new destination node (322F). Router 318C then launches the packet toward the ultimate destination, 322F.

Packet routing across sub-networks can similarly be achieved with packet setup routing. Under this scheme a source node simply transmits a route setup packet in the same manner as described above. All data packets which follow will be forwarded along the same route.

In the above described embodiments each node was provided with a PKL. While a PKL could be distributed manually to each node, the following describes the preferred embodiment for automatically distributing PKLs. First the ID/public key pairs of a limited number of "trusted" nodes 12, 16, 20 (FIG. 1) are manually distributed to all nodes and stored in a location 410 (FIG. 2) of each node's nonvolatile memory allocated to the trusted nodes. Further, each node allocates a block 412 of volatile memory 45 sufficiently large to accommodate a single packet from each of the M trusted nodes listed in nonvolatile memory 44.

Each trusted node 12, 16, 20 is then provided with a current PKL which it distributes automatically by enclosing the PKL in a packet and broadcasting the packet by flooding. Using PKL packets to broadcast updated PKLs automates the task of adding new nodes to the network. The new node simply notifies at least one of the trusted nodes of its assigned ID and public key, the trusted node being responsible for further distribution.

Figure 8A:
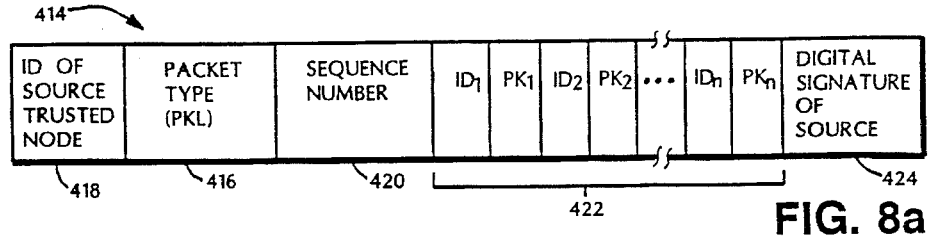
FIG. 8a is a diagram of the contents of a public key list packet.

Referring to FIG. 8a, each PKL packet 414 comprises a packet type field 416, a source ID field 418, a sequence number field 420, a data field 422 containing the PKL and a digital signature field 424. As explained above, the PKL comprises the ID 426 and associated public key 428 assigned to each node registered with the trusted node. Digital signature field 424 contains the signature of the trusted source node derived from the trusted node's private key and the digital patterns in fields 418–422.

Referring to FIGS. 2, 8a, 8b and 8c, each node receiving a PKL packet first determines 426 if the packet is valid. This validity test includes verifying 428 that the ID from field 418 corresponds to a trusted node ID 410 stored in the receiving node's memory 44. The packet is further verified by checking 430 the digital signature contained in signature field 424 using the trusted node's public key. Finally, data field 422 is checked 432 to assure that the number of nodes listed therein does not exceed the limit 52 indicated in the receiving node's memory 44. If the packet is found to be invalid by any of these tests, it is discarded 434.

If the PKL packet is valid, the receiving node next examines 436 sequence number field 420 to determine if the PKL packet is new or simply a belated transmission of an old packet. If the packet is old, it is discarded 438. If new, the packet is stored 440 in memory 412 and queued 442 for transmission to the appropriate neighbors.

After queuing the packet, the receiving node determines 444 if this is the first PKL packet to be received. If so, the node proceeds to allocate 446 memory space for the storage of various packets from each node listed in the PKL. Referring to FIG. 2, for each node the receiving node allocates 446 a block of memory 64 for the storage of a data packet and a block 66 for the storage of a link state packet.

If this is not the first PKL packet, the node examines 448 the contents of the PKL packet to determine if the memory allocation needs to be adjusted. If so, the node allocates 450 new memory blocks 64, 66 for the nodes only identified in the recently received PKL and frees 450 memory blocks allocated to nodes which no longer appear on any of the stored PKL lists. If no changes are needed, the memory allocation is left 452 in place.

The use of a plurality of trusted nodes provides several advantages including a means of defending against a malicious trusted node. For example, a malicious trusted node may transmit a valid PKL packet containing one or more incorrect node identifier-public key pairings. This incorrect information contradicts the information in the PKL packets received from other properly operating trusted nodes. Since the regular nodes have no mechanism for determining which PKL packet is flawed, the nodes treat each ID/public key pair as a unique node. In this way the node is ready to handle packets from every possible node on the network. However, under this scheme a node is no longer uniquely identified by its ID alone since the same ID may be assigned different public keys by different trusted nodes. Accordingly, in the above embodiments for routing, each citation to a node ID must be supplemented with further information. For example, each cited ID could be accompanied by one of its associated public keys to uniquely identify the selected node. For example, the source node ID field in each type of packet may be accompanied by an additional public key field 452 (e.g. FIG. 3a, 4a, 6a) containing the associated public key. However, since public keys may be hundreds of bits long, this would be particularly burdensome in packets such as route setup packets 210, packet specified data packets 98 and link state packets 68 each of which may contain many ID/public key pairs. Accordingly, the preferred approach is to supplement the citation to a node ID with the identity of the trusted node which assigned the associated public key.

To illustrate, in one embodiment, each LSP includes a trusted node field listing all trusted nodes which agree on the public keys of each neighbor listed in field 78. In this embodiment, each node may issue multiple LSPs, one for each group of trusted nodes which are in agreement. Accordingly, when calculating a route, a source node has multiple, inconsistent images of the network available to it. It selects an image (i.e. a family of LSPs from trusted nodes in agreement) and computes a first attempted route. This route is loaded into either route field 112 (FIG. 4a) of a data packet, if packet specified routing is used, or route field 220 (FIG. 6a), if route setup routing is used. However, to uniquely identify the nodes referred to in the route list, each of the above packets must include a trusted node field containing the ID of at least one trusted node from the group of trusted nodes associated with the selected family of LSPs.

If the source node fails to receive a destination acknowledge, it can select a different family of LSPs and compute a new route. Herein lies the defense against malicious trusted nodes. If at least one properly functioning trusted node exists, the source node will eventually select its family of LSPs. The route calculated from that family will not be influenced by the activities of the malicious trusted node.

Other embodiments are within the following claims.

What is claimed is:

1. A method for routing a packet from a source node to a destination node in a network of nodes interconnected by links, said source node and said destination node belonging respectively to different subnetworks, each subnetwork having a router, the routers of the subnectworks being organized in hierarchical levels for routing of said packet between said subnetworks, the routers of each of said hierarchical levels being interconnected, comprising sending packets from said source node to a first router within the subnetwork to which said source node belongs based on a route completely determined at the source node, determining, in said first router, a complete route to a destination router within one of said hierarchical levels to which said first router and said destination router belong, said route leading toward said destination node, iterating the preceding step in a manner in which said destination router of each iteration becomes the first router of the next iteration, until the destination router is a router within a subnetwork to which said destination node belongs, at said destination router within said subnetwork to which said destination node belongs, determining a complete route to said destination node, and sending said packet from said router along said determined route.

2. The method of claim 1 further comprising including in said packet sent from said router information specifying said determined route.

3. The method of claim 1 further comprising sending a route setup packet from said router prior to sending said packet from said router, said route setup packet including information specifying said determined route.

4. The method of claim 1, 2, or 3 wherein said packet is cryptographically authenticated in each said router.

5. Apparatus for routing a packet from a source node to a destination node in a network of nodes interconnected by links, said source node and said destination node belonging respectively to different subnetworks each sub-network having a router, the routers of the subnetworks being organized in hierarchical levels for routing of said packet between said subnetworks, the routers of each of said hierarchical levels being interconnected, comprising source node circuitry for sending said packet to a first router within the subnetwork to which said source node belongs, based on a route completely determined at the source node, said router comprising router circuitry for determining, in said first router, a complete route to a destination router within one of said hierarchical levels to which said first router and said destination router belong, said route leading toward said destination node, iterating the preceding step in a manner in which said destination router of each iteration becomes the first router of the next iteration, until the destination router is a router within a subnetwork to which said destination node belongs, and at said destination router within said subnetwork to which said destination node belongs, determining a complete route to said destination node, and circuitry for sending said packet from said router along said determined route.

6. A method for regulating the delivery of packets from source nodes to destination nodes in a network of nodes interconnected by links, comprising including sequence data in one or more packets, the sequence data in a packet from a source node indicating the relative age of said packet compared to other packets from the same said source node, sending each packet from a source node to a destination node via a predetermined route, in each node, storing information from received packets by allocating predetermined portions of memory to respective other source nodes of the network, each portion for storing information associated with an other source node, and further for storing sequence data from a packet which contained said information, and regulating the use of each said memory portion of a node by storing received information associated with an other source node only if sequence data from a packet containing said received information is more up-to-date than the sequence in said memory portion allocated to said other source node.

7. The method of claim 6 wherein said information associated with said other source node comprises data packets being delivered from said other source node to destination nodes.

8. The method of claim 6 wherein said information associated with said other source node comprises network information concerning said other source node, said network information being used in delivering packets from said other source node to destination nodes.

9. The method of claim 8 further comprising including in each said packet, information specifying a route through said network from a source node to a destination node.

10. The method of claim 8 further comprising including in each said packet a sequence value indicating the packet's relative position in a time sequence of packets sent from the node which was the source of the packet, in a node which is along the route from the source node to the destination node, storing in the memory portion allocated to said source node, network information contained in packets received from said source node, and regulating the storage of network information in a given said memory portion in a manner that favors the storage of more current network information.

11. The method of claim 10 wherein said regulating comprises discarding stored information that is less recent than currently received information.

12. The method of claim 10 further comprising determining the currency of said information based on said sequence value.

13. The method of claim 8 wherein said network information comprises public key information which enables a node receiving a packet from a source node to verify the validity of said packet.

14. Apparatus for regulating the delivery of packets from source nodes to destination nodes in a network of nodes interconnected by links, comprising source node circuitry for sending each packet from a source node to a destination node via a predetermined route, one or more packets including sequence data, the sequence data in a packet indicating the relative age of said packet compared to other packets from said source node, each said node comprising circuitry for storing information from received packets by allocating predetermined portions of memory to respective other source nodes of the network, each portion for storing information associated with an other source node, and further for storing sequence data from a packet which contained said information, and each said node further comprising circuitry for regulating the use of each said memory portion of a node by storing received information associated with an other source node only if sequency data from a packet containing said received information is more up-to-date than the sequence data in said memory portion allocated to said other source node.

15. A method for routing a packet from a source node to a destination node in a network, comprising forming at the source node a route setup packet including (a) a sequence number indicating the relative position of the route setup packet in a time sequence of packets issued from the source node, (b) a signature which identifies the source node for use in validating the packet, and (c) route information identifying intermediate nodes lying along a route between the source node and the destination node, sending the route setup packet to the destination node via an intermediate node, verifying in the intermediate node the validity of the route setup packet based on the signature, storing in the intermediate node route information from the setup packet, the stored route information identifying a previous node along the route via which packets from the source node are expected to reach the intermediate node on their way to the destination node, subsequently sending the data packet from the source node via the route to the destination node, and verifying the data packet at the intermediate node by confirming that it has reached the intermediate node from the expected previous node.

16. Apparatus for routing a packet from a source node to a destination node in a network, comprising source node circuitry for forming a route setup packet including (a) a sequence number indicating the relative position of the route setup packet in a time sequence of packets issued from the source node, (b) a signature which identifies the source node for use in validating the packet, and (c) route information identifying intermediate nodes lying along a route between the source node and the destination node, delivery circuitry for sending the route setup packet to the destination node via an intermediate node, said intermediate node comprising circuitry for verifying the validity of the route setup packet based on the signature, circuitry for storing in the intermediate node route information from the setup packet, the stored route information identifying a previous node along the route via which packets from the source node are expected to reach the intermediate node on their way to the destination node, and circuitry for verifying the data packet at the intermediate node by confirming that it has reached the intermediate node from the expected previous node.

17. A method for routing a packet from a source node to a destination node in a network comprising sending said packet from said source node toward said destination node along a first route via intermediate nodes, at the source node, awaiting an acknowledgment by said destination node of receipt of said packet, eventually, if no acknowledgment is received at the source node, after a timer period determining an alternate route to said destination node which shares no intermediate nodes in common with the first route, and sending the packet via the alternate route.

18. A method for routing a packet from a source node to a destination node in a network comprising sending said packet from said source node toward said destination node along a first route via intermediate nodes, at the source node awaiting an acknowledgment by said destination node of receipt of said packet, eventually, if no acknowledgment is received at the source node, after a timer period broadcasting said packet throughout the network.

19. The method of claim 17 or 18 further comprising prior to sending said packet from a first router along said first route, determining said first route.

20. The method of claim 19 further comprising prior to sending said packet from said first router, sending a route setup packet from said source node to said destination node, said route setup packet specifying said first route.

21. The method of claim 19 comprising including in said packet information describing said first route.

22. The method of claim 19 wherein said first route is cryptographically authenticated at nodes along said first route.

23. Apparatus for routing a packet from a source node to a destination node in a network, said source node comprising circuitry for sending said packet from said source node toward said destination node along a first route via intermediate nodes, circuitry for awaiting an acknowledgment by said destination node of receipt of said packet, circuitry for determining an alternate route to said destination node which shares no intermediate nodes in common with the first route, if no acknowledgment is eventually received at the source node after a time period, and circuitry for sending the packet via the alternate route.

24. Apparatus for routing a packet from a source node to a destination node in a network wherein said source node comprises circuitry for sending said packet from said source node toward said destination node along a first route via intermediate nodes, circuitry for awaiting an acknowledgment by said destination node of receipt of said packet, circuitry for broadcasting said packet throughout the network if no acknowledgment is eventually received at the source node after a time period.

25. A method for regulating the delivery of data packets from source nodes to destination nodes in a network of nodes interconnected by links, comprising sending each packet from a source node to a destination node via a predetermined route including intermediate nodes, said predetermined route including at least one link leading from one of said intermediate nodes, said packets including a first set of said packets originating from a first of said source nodes and routed via said one of said intermediate nodes, and a second set of said packets originating from others of said source nodes, and limiting the number of packets in said first set that are transmitted sequentially on said link while a packet in said second set is awaiting delivery on said link.

26. The method of claim 25 wherein said allocation is done on a round-robin basis.

27. Apparatus for regulating the delivery of data packets from source nodes to destination nodes in a network of nodes interconnected by links, comprising circuitry for sending each packet from a source node to a destination node via a predetermined route including intermediate nodes, said predetermined route including at least one link leading from one of said intermediate nodes, said packets including a first set of said packets originating from a first of said source nodes and routed via said one of said intermediate nodes, and a second set of said packets originating from others of said source nodes, and intermediate node circuitry for limiting the number of packets in said first set that are transmitted sequentially on said link while a packet in said second set is awaiting delivery on said link.

28. A method of regulating the delivery of packets from source nodes via intermediate nodes to destination nodes in a network of nodes interconnected by links, comprising distributing to nodes in the network, information about the state of links interconnecting nodes in the network, said link state information being distributed to a given node in a network from more than one other trusted node, said other trusted nodes serving as sources of said link state information, in said given node, determining a route from said given node to a destination node using link state information stored in said given node, said route determination being made using only link state information received from a single one of the trusted nodes.

29. A method of sending information from a source node to a destination node in a network of nodes interconnected by links, comprising assigning to each node a public key, a private key, and an identifier, said private key being used by a node which is a source of a packet, to generate a signature based on data to be sent to a destination node via a predetermined route, said public key being used by intermediate nodes along said route to verify the validity of the packet as received from said source node, assembling, in selected trusted nodes, identifiers and corresponding public keys for nodes in said network, including in a packet, information identifying the nodes along the route to be traveled by the packet and an identifier of one of said trusted nodes which contains information with respect to the public keys to be used by nodes along the route, the packet not containing any public keys.

* * * * *